United States Patent [19]

Nicholas

[11] 3,715,702
[45] Feb. 6, 1973

[54] RELATIVE HUMIDITY SENSOR

[75] Inventor: Merle Nicholas, Minneapolis, Minn.

[73] Assignee: Honeywell Inc., Minneapolis, Minn.

[22] Filed: June 23, 1971

[21] Appl. No.: 155,987

[52] U.S. Cl. .................. 338/35, 73/335, 200/61.06, 340/235
[51] Int. Cl. .............................................. H01c 13/00
[58] Field of Search ....338/34, 35; 200/61.04, 61.06; 73/336.5, 338, 335; 340/235; 252/461, 472

[56] References Cited

UNITED STATES PATENTS 3,345,596 10/1967 Delaney et al. ......................... 338/35
3,369,880 2/1968 Mochel .............................. 338/35 X Primary Examiner—C. L. Albritton
Attorney—Lamont B. Koontz

[57] ABSTRACT

An essentially full range resistance type relative humidity sensing element is produced by providing a dielectric blank, on which an electrode system has been applied, with a metal oxide coating, in a manner which produces a porous structure therein, and subsequently impregnating that coating with a humectant material. The metal oxide used is selected from a group, including oxides of the metals found in Group VIII, Period 4 of the Periodic Table, which exhibit electrical insulating properties, and wherein the amount of electrical resistance varies with the relative humidity of the environment to which it is exposed. The humectant material, which may be any non-volatile, reversibly hygroscopic material capable of being retained in the porous oxide structure, such as polyethylene glycol, for example, reduces both the amount of electrical resistance and the magnitude of the change in that resistance produced in response to changes in relative humidity into a range readily measured by ordinary electrical resistance measuring devices.

9 Claims, 3 Drawing Figures

| SENSOR | OXIDE | IMPREG |
|--------|-------|--------|
| B | $Fe_2O_3$ | NONE |
| A | $Fe_2O_3$ | HUM |

INVENTOR.
MERLE E. NICHOLAS

RELATIVE HUMIDITY SENSOR

BACKGROUND OF THE INVENTION

1. Field of the Invention

The present invention relates broadly to relative humidity sensing devices and, more particularly, to a specially treated, metal oxide, resistance type moisture sensitive element and method of fabrication.

Reference is made to the inventor's co-pending application of even date, assigned to the same assignee, now Ser. No. 155,919 which is also generally concerned with a modified metal oxide relative humidity sensor. By that invention a sensor is produced characterized by a moisture-sensitive medium comprising a covalently bonded metal oxychloride; whereas the sensor of the present invention has a moisture-sensitive medium comprising a metal oxide impregnated with a humectant material which is not chemically bonded to the oxide.

2. Description of the Prior Art

It has long been known that the oxides of certain metals exhibit properties which make them useful as electrical resistance materials. It has also been recognized that the electrical resistance of certain metal oxides varies with changes in the relative humidity of the air to which they are exposed. As commonly defined and used herein, the term "relative humidity" refers to the ratio of the amount of water vapor contained in the air to that amount which would saturate air at the same temperature. It is also known that attempts have been made in the prior art to utilize the property of changing resistance with changing relative humidity inherent in such materials to produce humidity sensitive elements. One example of this is found in a patent issued to R. A. Delaney et al., U.S. Pat. No. 3,345,596, issued Oct. 3, 1967. That disclosure illustrates and describes a metal oxide type humidity sensing device in which the resistance element is composed of amorphous cobalt-cobaltic oxide ($Co_3O_4$), heat treated to produce a highly crystalline surface in which the cobalt-cobaltic oxide is transformed into cobaltous oxide (CoO) which exhibits hygroscopic properties.

It has also been shown that the properties of some resistors may be modified by impregnating the resistance material with a humectant material. Thus, a patent issued to L. S. Craig, U.S. Pat. No. 3,247,478, dated Apr. 19, 1966 discloses the addition of a humectant, such as polyoxyethylene sorbitol, may be used to modify the resistance of a carbon material, subsequently used in a relative humidity sensor.

While the devices of the prior art have been used to sense relative humidity, those devices have been only partially successful. The metal oxide type devices found in the prior art, of which the first above-mentioned patent is an example, have several drawbacks which severely limit their usefulness. While such devices do exhibit changes in electrical resistance which correspond to changes in the relative humidity of the air to which they are exposed, it has been found that the usable range of such devices, for practical purposes, is limited to a relative humidity range which extends above 30 percent relative humidity. The overall resistance of these devices is still extremely high and, in order to measure the full relative humidity range, they require a metering device capable of accurately covering a span of up to six orders of magnitude in the resistance change, typically from about $10^4$ to $10^{10}$ ohms. Below the 30 percent limitation, the resistance becomes extremely high and is very difficult to accurately monitor. Thus, in the high resistance range, conductance across the uncoated opposite face of the dielectric substrate becomes a factor which interferes with attempts to accurately measure the resistance of the sensing medium alone.

In other devices, such as the second example given above, while the range and value of the resistance is considerably reduced thereby bringing them within the scope of standard measuring equipment, the resistance values obtained using such devices are extremely temperature dependent. More importantly, the hygroscopic properties associated with those devices have been found to be only partially reversible. In other words, such devices take on water from the environment much more easily than they give it up. Thus, while their response to a condition of rising relative humidity may be acceptable, such devices do not readily respond to a condition of dropping relative humidity. If saturated or fogged, such devices may become useless.

SUMMARY OF THE INVENTION

By means of the present invention, there is produced a unique sensing element which exhibits desirable qualities not found in prior art devices while overcoming the limitations associated with those devices. A base member formed of a dielectric, substantially inert material supplied with a suitable electrode system is treated in a manner which creates a conductive path between the electrodes through a humidity sensitive resistance material comprising a stable, highly porous metal oxide coating containing a reversibly hygroscopic material. The sensing element thus produced not only exhibits a much lower total electrical resistance but also achieves a narrower range of variation in resistance with change in relative humidity than was possible with prior oxide type sensors thereby greatly facilitating adaptation to essentially full range use.

In addition, the open porous structure of the coating achieved by the process of the invention significantly improves both the response time of the sensor to changes in relative humidity and enhances its ability to retain the hygroscopic material contained therein. Humidity sensing elements made in accordance with the present invention have been found to be completely reversible, as the relative humidity raises and lowers. They exhibit virtually no calibration drift due to hysteresis and, due to the physical and chemical stability of the coating, remain useful for a long period of time. Sensors produced in accordance with the present invention may be made very small in size and are compatible with solid state or other circuitry. This renders such sensors readily adaptable for such uses as in rectifier circuits for proportional humidifiers or in conjunction with other applications of electric circuitry.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
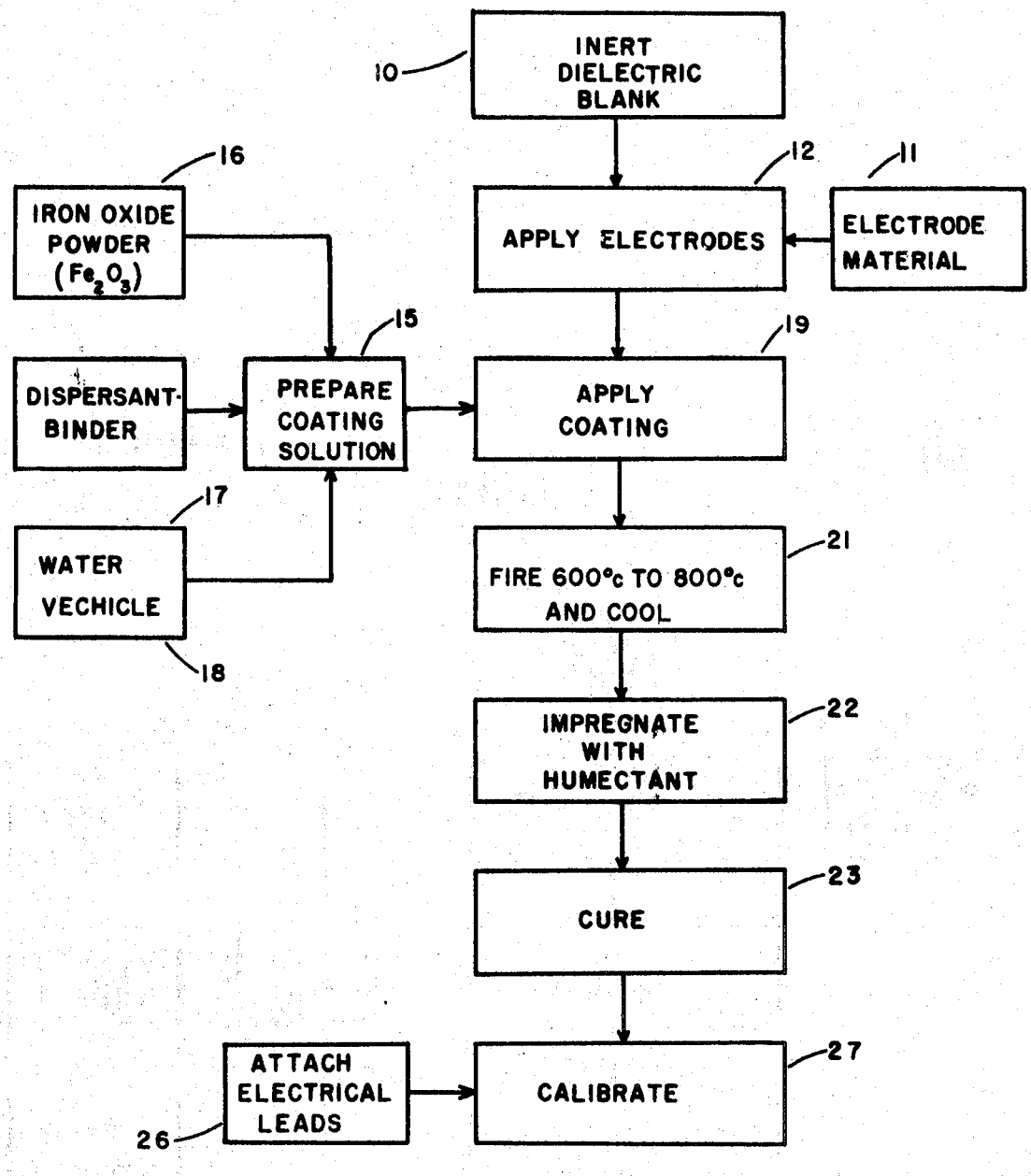
FIG. 1 is a block flow diagram illustrating the method for fabricating the device of the present invention.
Figure 2:
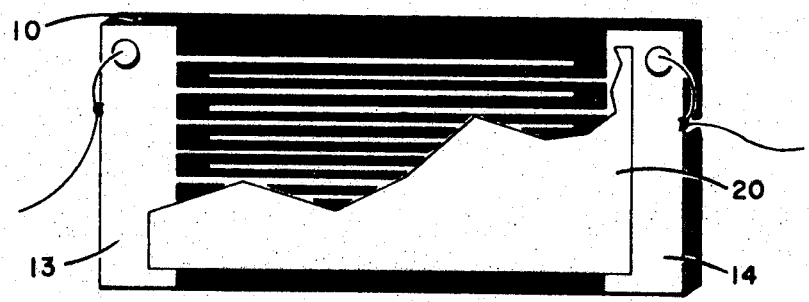
FIG. 2 is an enlarged plan view of the invention with parts cut away showing the under layers in the structure.

Referring now to the drawings and, more particularly, to the graphic flow diagram illustrated in FIG. 1, there is shown summarily a step-wise process for producing the sensor illustrated in FIG. 2. The inert dielectric blank 10, forms the basic substrate upon which the active components of the sensing element are applied. The material forming the dielectric blank 10 may be any relatively rugged dielectric material which is not affected by the presence of water vapor in the air and does not chemically react with the material forming the electrodes thereon or with the materials forming the sensitive resistor. Quartz is an example of a material that has been used successfully to produce sensors in accordance with the invention and it is contemplated that other substantially inert materials would also be readily adaptable to such use.

The size of the blank 10 which, of course, determines the size of the humidity sensor ultimately produced therefrom is not critical and may be any size convenient for the required application of the sensor. One of the distinct advantages of the present invention is that the sensors themselves can be made extremely small. Thus, in accordance with the present invention, highly successful sensors have been made having an overall size as small as approximately 0.45 inches long by 0.2 inches wide by 0.02 inches thick.

The material 11 forming the electrodes may be any noble metal conventionally used for such purposes. Thus gold, palladium and platinum have been successfully used. The application 12 of the electrodes 13 and 14 (FIG. 2) may be accomplished using any appropriate conventional method. One representative technique which has been successfully used involves coating sections of the blank material 10 large enough to provide a plurality of finished sensing elements with a solution containing the noble metal of the electrodes, firing the coated blank material at a sufficiently elevated temperature, and in an appropriate atmosphere, to reduce the metal and cause it to adhere to the blank material. The desired configuration of the electrodes is then achieved by placing a photoresistor upon the metal film and stabilizing the desired areas using a mask and ultraviolet light. The metal not required for the electrodes is then removed by chemical etching techniques. The larger blank is then sectioned in a conventional manner into the individual sensors for the next step in the process. While no particular electrode configuration is required, one resembling intermeshed comb teeth (known also as an interdigital electrode system) is preferred as it increases the adjacent surface length of the opposite electrodes to aid in reducing the resistance therebetween.

As discussed above, it is well known that the oxides of many metals, when in a relatively pure form, exhibit the high resistance of electrical insulators. It is also known that certain of these metal oxides are somewhat hygroscopic in nature which affects their insulating properties such that when exposed to an atmosphere containing a quantity of water vapor, the value of the electrical resistance changes in relation to the amount of water vapor in the atmosphere. That latter property has been noted, especially in the mid-range of from 40 percent relative humidity to 70 percent relative humidity. While any insulating metal oxide will exhibit some of the properties desired for relative humidity sensing in accordance with the present invention, desirable properties including humidity dependent resistance and a high degree of chemical stability are especially prevalent in the oxides of the metals of Group VIII, Period 4 of the Periodic Table of the Elements. Thus, while others may be used, the oxides of iron, nickel and cobalt are preferred in accordance with the present invention. Representative successful sensors have been made utilizing nickel oxide ($Ni_2O_3$), nickelous oxide (NiO) and iron oxide ($Fe_2O_3$). While the iron oxide ($Fe_2O_3$) will be used in the present description of the preferred embodiment of the invention, it is contemplated that any metal oxide exhibiting the required properties may be substituted for the iron oxide in the humidity sensing element of the invention.

One successful method of preparing the coating solution 15 for the sensor of the invention involves mixing finely divided reagent grade iron oxide ($Fe_2O_3$) powder 16 with a small amount of a binder material 17, for example, polyvinyl alcohol, and a sufficient amount of pure water 18 to provide a good ball-milling slurry. The slurry is rotated in a ball-mill to disperse the oxide particles in the mixture. The finished slurry is then brought to the proper concentration with additional pure water. While the composition is not thought to be critical, a typical coating solution contains from about 2.0 to 5.0 percent of the metal oxide, from 0.01 to 0.05 percent of the binder and the balance pure water. One specific coating mixture used successfully includes 3.72% $Fe_2O_3$, 0.03 percent polyvinyl alcohol and the balance pure water.

The completed solution is then coated, at 19, on the sensor blank 10, overlapping the electrodes, preferably by spraying to produce a more uniform coating. The coating 20 may be sprayed on by any conventional type solution spraying device which produces a uniform layer. The film may be applied in one thick layer, but is preferably applied in successive thin layers with intermediate drying therebetween. It may also be noted, that the final thickness of the coating in accordance with the present invention has not been found to be critical. Thus, any coating which is sufficient to provide a good electrical path between the electrodes, yet not thick enough to crack or peel, has been found to be adequate.

The firing step 21 involves heating the coated blank 10 to a temperature in the range of 600° to 800°C, soaking or holding it in that temperature range for a period of time sufficient to pyrolyze and remove the binder by evaporation, give cohesion to the metal oxide film and adhesion between the film and the sensor blank 10. This normally requires from about one to two hours. In connection with this step, the coated blanks 10 are typically fired at 700°C for a period of one and one-half hours. The firing step 21 also accomplishes another important objective inasmuch as the vaporization of the binder imparts a porous structure to the metal oxide coating remaining on the blank 10. This porosity has been found to be extremely important both from the standpoint of retaining the humectant material, which is added in accordance with the step 22, described later, in the coating and in increasing the effective surface area which ultimately is exposed to the atmosphere, the humidity of which is to be measured, thereby increasing the efficiency of the device. The blank is then cooled to room temperature in preparation for the next step in the process.

An important aspect of the present invention is the addition of a humectant material to the metal oxide coating of the sensor. The humectant material may be defined generally as a chemical moistener that will, because of its chemical structure, attract large quantities of water vapor. In accordance with the step 22, the fired iron oxide coating is impregnated with the humectant material, normally by dipping the blank into a solution containing the humectant material, but the material may also be applied by other conventional methods.

Selecting the proper humectant material for use in the present invention is important and several factors must be considered. Some ionic humectant materials such as lithium chloride, for example, exhibit excellent moisture attracting properties, when proceeding from a condition of low relative humidity to one of high relative humidity; however, such compounds do not readily give off the attracted water as the humidity decreases and once saturated may be made completely ineffective. In other words, the ability of such compounds to attract water vapor is not sufficiently reversible. Some of the other compounds conventionally used in humidity sensors have been found to be only partially reversible. While such compounds allow measurement of relative humidity which is both increasing and decreasing, the amount of irreversibility in the adsorption process results in a shift of the calibration curve for such a sensor due to hysteresis. The shift in the curve of resistance versus relative humidity severely limits the usefulness of such devices. Thus, it is an important aspect of the present invention that the adsorption properties of the humectant material chosen be as reversible as possible. In addition to being reversible, it is desirable that the humectant material be one which responds quickly to relative humidity changes in either direction. The open porous nature of the sensing surface produced in accordance with the present invention also requires that the humectant material contained therein by one which is not readily lost to the atmosphere through evaporation in the temperature range in which the sensor is used. One compound which has been found to combine the above properties is polyethylene glycol which is readily available in commerce. This compound in the form of Gafanol E-200 manufactured by General Aniline and Film Corporation, New York, New York, has been used successfully in the sensors of the present invention. It has been found that only a minute amount of the humectant material need be present on the surface of the sensor to achieve the desired results as discussed below.

A final step in preparing the sensor for use as a relative humidity responsive element is the curing step 23. The response of most relative humidity sensitive elements has been found to be somewhat erratic when such elements are first exposed to changes in relative humidity. In accordance with the curing step of the present invention, before the sensor is calibrated, this erratic behavior is overcome by exposing the sensor to an atmosphere of controlled relative humidity wherein the percent relative humidity is varied in a controlled manner from about 10 percent relative humidity to 90 percent relative humidity and back to 10 percent relative humidity through several cycles. During each cycle, the sensor is allowed to stabilize at several points within the 10 to 90 percent relative humidity range. The time allowed for each cycle for the humidity sensor to stabilize has not been found to be critical and, normally, about 40 minutes is allowed. The curing environment may be created by any conventional method for proportioning known amounts of dry air and air saturated with water vapor into a chamber at a known temperature.

After the sensor has been exposed to several relative humidity cycles, the electrical leads 24 and 25 (FIG. 2), which may be any conventional electrical leads required to be compatible with the system in which the relative humidity sensor will be used, are attached to the electrodes 13 and 14, indicated at 26, in a well-known manner.

The sensor is then calibrated at 27 by returning it to the controlled humidity environment and utilizing conventional electrical methods to note the value of the resistance of the element at several relative humidity values. Thus, the calibration device may include a conventional AC impedance bridge for measuring resistance and the values may be noted from a meter or recorded on a conventional round or strip chart recorder. In regard to the AC power used in calibration, it has been discovered that the actual resistance values obtained are somewhat dependent on the frequency used. As the frequency of the calibrating current is increased, the resistance decreases for a given relative humidity. Thus, when calibrating the sensor, the frequency of the AC power used should correspond to that which will exist in the circuit of ultimate use to assure an accurate calibration.

In regard to the above-described method of making the sensors of the present invention, some experimentation is being conducted in an attempt to simplify the procedure involved. The results as yet, however, are inconclusive.

Figure 3:
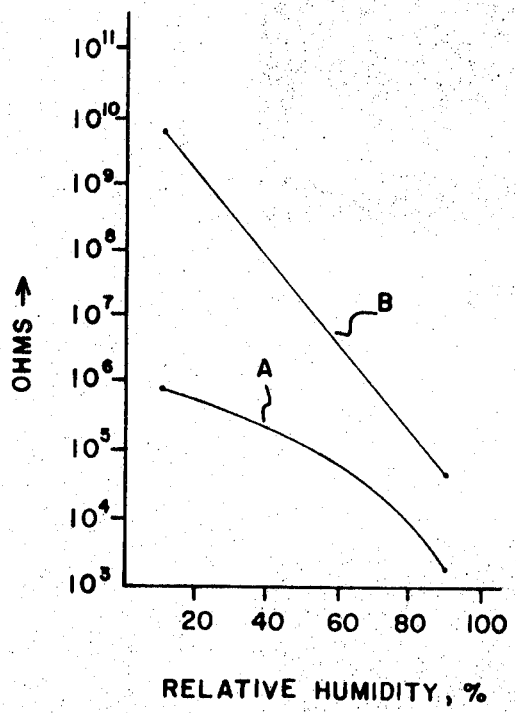
FIG. 3 is a graphical representation of a typical calibration curve relating the resistance of the sensor of the invention with corresponding relative humidity values and a curve relating the sensor of the invention to a typical untreated metal oxide type sensor.

In FIG. 3, there is shown at "A" a typical calibration curve relating the resistance of a sensor fabricated in accordance with the present invention to corresponding relative humidity values. A comparison curve is shown at "B" which relates the resistance of a typical untreated iron oxide type sensor with its corresponding relative humidity values. Both devices were calibrated using 60 Hz AC power. This comparison dramatically illustrates the reduction of both the total resistance and the range over which the resistance varies with changing relative humidity accomplished by the sensor fabricated in accordance with the present invention. Thus, the resistance of the iron oxide coating in the low relative humidity range has been successfully reduced from values above $10^9$ ohms to less than $10^6$ ohms and the range of values has successfully been reduced from more than five orders of magnitude to less than three orders of magnitude. This brings the value of the resistance of the sensor well within the scope of operation of ordinary electrical metering equipment. As indicated above, even lower resistance values can be obtained using AC frequencies above 60 Hz.

Sensors made in accordance with the present invention have been found to exhibit good stability over a fairly long period of time with very little shift from the original calibration curve. Because the iron oxide used is at its highest state of oxidation ($Fe_2O_3$) and is therefore unaffected by exposure to the atmosphere, the only factor which reduces the useful life of these sensors is the eventual loss of the humectant material from the porous iron oxide structure through vaporization. It is normally many months, however, before this humectant loss affects the calibration of the sensor. It is also possible to increase the useful life of the sensor by substituting a hygroscopic polymer exhibiting superior stability from the standpoint of evaporation for the humectant presently described in the sensor.

The response of the sensor of the invention to changes in relative humidity in the air to which it is exposed has been found to be extremely rapid when compared with that of other devices. As a result, it has also been found possible to coat the sensor of the present invention with a thin, moisture-permeable plastic membrane to enhance both its useful life and durability without seriously affecting the useful application of the device. A thin layer of a material such as polyvinyl alcohol sheet, for example, has been found to allow ingress and egress of moisture to the sensor surface with a speed sufficient to maintain the response time of the device within the limits required for most applications.

The embodiments of the invention in which an exclusive property or right is claimed are defined as follows:

1. A moisture sensitive element comprising spaced metal electrodes, an electrically insulating metal oxide coating overlapping said electrodes, said oxide having an electrical resistance which is humidity-dependent, said coating having a porous structure, the pores thereof being impregnated with a reversibly hygroscopic humectant material, and electrical leads attached to said electrodes.

2. A moisture sensitive element as claimed in claim 1, including a substantially inert dielectric blank member and a noble metal electrode system applied to said blank member.

3. A moisture sensitive element as claimed in claim 1, wherein said metal oxide is one selected from the oxides of the elements contained in Group VIII, Period 4 of the Periodic Table of the Elements.

4. A moisture sensitive element as claimed in claim 3, wherein said metal oxide is $Fe_2O_3$.

5. A moisture sensitive element as claimed in claim 1, wherein said humectant material is a stable hygroscopic polymer.

6. A moisture sensitive element as claimed in claim 5, wherein said humectant is polyethylene glycol.

7. A moisture sensitive element as claimed in claim 1, including a moisture-permeable membrane superimposed over said coating.

8. A moisture sensitive element as claimed in claim 7, wherein said moisture-permeable membrane is polyvinyl alcohol sheet.

9. A moisture sensitive element as claimed in claim 2, wherein said electrode system has an interdigital configuration.

* * * * *